Feb. 4, 1969   A. L. McCONNELL ET AL   3,425,882
METHOD OF MAKING PATTERNED FOAM-TO-FABRIC LAMINATES
Filed April 20, 1965
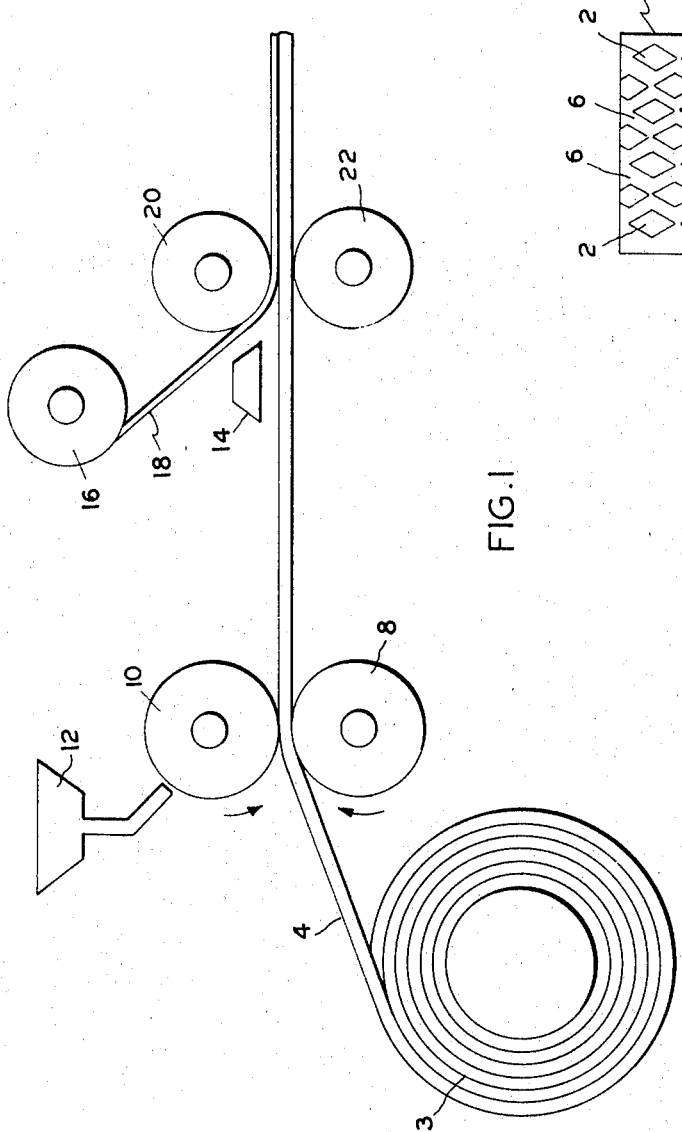
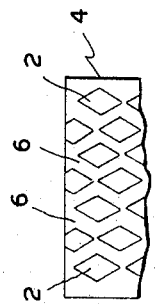
INVENTORS
ALBERT L. McCONNELL
FRED W. MEISEL, JR.
WHITNEY R. ADAMS
BY
ATTORNEY United States Patent Office 3,425,882
Patented Feb. 4, 1969

3,425,882
METHOD OF MAKING PATTERNED
FOAM-TO-FABRIC LAMINATES
Albert L. McConnell, Sproul Estates, and Fred W. Meisel, Jr., Philadelphia, Pa., and Whitney R. Adams, Wilmington, Del., assignors to Scott Paper Company, Philadelphia, Pa., a corporation of Pennsylvania
Filed Apr. 20, 1965, Ser. No. 449,527
U.S. Cl. 156—82          8 Claims
Int. Cl. B32b 3/30, 5/18

ABSTRACT OF THE DISCLOSURE

Process for producing a patterned foam-to-fabric laminate by selectively applying a discontinuous pattern of a non-combustible liquid to a surface of the foam, heating said surface with a flame to melt the unmasked areas of said surface and intimately contacting said surface with a fabric sheet and compressing said sheets together.

---

This invention relates to a process for preparing foam-to-fabric laminates having a pattern thereon. More particularly, this invention relates to a process for obtaining quilted or various patterns on foam-to-fabric laminates wherein selected areas of the foam surface are masked or covered with a liquid which insulates said selected areas from a subsequent flame treatment.

Heretofore, foam-to-fabric laminates having a pattern thereon have been prepared, for example, by sewing a foam sheet to a fabric backing along spaced-apart lines corresponding to the outline of the pattern desired. In this method, however, the stitching causes perforations which render the laminate, and particularly the foam, susceptible to tearing and separation. In addition, this method is undesirably slow and therefore expensive. Another method is to saturate or thoroughly impregnate a foam sheet with a relatively quick-setting adhesive along lines corresponding to the pattern desired. The thus treated foam is then joined to a fabric sheet and the two compressed together to form the laminate. While this method may be somewhat superior to the foregoing method of sewing, it destroys the breathability and insulating qualities of the laminate in the areas which have been saturated with adhesive. Moreover, both of the prior art methods of forming patterned laminates result in a laminate which lacks sufficient drape. This characteristic is, of course, desirable and necessary when preparing foam-to-fabric laminates which are to simulate conventional blanket stock.

The principal object of this invention, therefore, is to provide a process for obtaining a quilted or various patterns on a foam-to-fabric laminate which overcomes the aforementioned disadvantages.

Another object of this invention is to provide a process for preparing a quilted or other patterned foam-to-fabric laminates which have excellent drape characteristics.

Another object is to provide a process for preparing a quilted or various patterns on foam-to-fabric laminates which is simple and economical to operate, yet yields a thick laminate in proportion to the amount of foam sheeting required heretofore.

Another object of this invention is to provide a process for preparing patterned foam-to-fabric laminates which are highly resistent to peeling and tearing.

Another object is to provide a process for obtaining quilted or various patterns on foam-to-fabric laminates which results in a patterned laminate usable as a blanket material possessing light-weight and good insulation plus breathability.

Other objects and advantages of this invention will appear in the following description and appended claims, reference being had to the accompanying drawing forming a part of the specification wherein like reference numerals designate corresponding parts in the drawing.

In the drawing:

FIGURE 1 is a diagrammatic elevational view illustrating one form of apparatus for carrying out the process of this invention; and FIGURE 2 is a top view of a foam treated in accordance with the invention preparatory to lamination.

Before explaining the present invention in detail it is to be understood that the invention is not limited in its application to the details of construction and arrangements of components illustrated in the accompanying drawing, since the invention is capable of other embodiments and of being practiced or carried out in various ways. Also it is to be understood that the phraseology or terminology employed herein is for the purpose of description and not of limitation.

In accordance with the present invention, it has been found that quilted or other patterned foam-to-fabric laminates can be prepared by a flame lamination process wherein selected surface areas of the foam sheet are masked or covered with a liquid which insulates said selected areas from subsequent flame treatment. In this manner, when the foam sheet is exposed to a flame, only the open or unmasked areas of the foam surface will be melted or adhesively activated for gluing the foam sheet to a fabric backing sheet. For example, referring to FIGURE 2, if it is desired to prepare a quilted laminate, the liquid is applied to the selected diamond-shaped areas 2 of the foam 4. Thereafter, the foam surface is exposed to a flame which will adhesively activate the unmasked or untreated areas 6 by forming a thin layer of melted polymer. Upon bringing the foam sheet into contact with a fabric sheet and compressing the two together, a strong bond will be formed between the areas 6 and the fabric sheet. As a result of the preliminary treatment of the foam surface with the liquid, a bond will not be formed between the areas 2 and the fabric sheet. Thereby, a durable quilted laminate having excellent drape is obtained which simulates a high quality blanket.

In carrying out the process of this invention, any foam material may be employed which is adhesively activated upon exposure to heat, including both foam-type thermoplastic resins, such as polystyrene, polyethylene, and polypropylene, and foam-type elastomers such as polyurethane. Among the foam materials which are most suitable for this invention are the flexible foam sheet materials such as the polyether and polyester urethanes and vinyl polymers such as polyvinylchloride and its copolymers. The thickness and density of the foam sheet are capable of wide variations.

Among the fabrics which may be employed in the process of this invention are the bleached and unbleached cotton fabrics, rayon, nylon, muslin and many other natural and synthetic fabric materials.

The liquid employed to selectively coat the surface of the foam prior to flame treatment can be of many different compositions depending upon several factors. It is important that the liquid be non-combustible and be compatible with a particular foam material so that it will demonstrate the desired characteristics as far as wetting ability, ability to hold itself in a given fixed pattern once it has been applied to the foam surface in such pattern, and ability to maintain the coated surface of the foam sheet inactive during flame treatment. Other criteria involved are the length of time between the application of the fluid and the flame treatment process and the ability of the liquid to evaporate or stabilize in a desirable form after the lamination process is completed.

Among the liquids which can be employed in the invention are water, dichlorodifluoromethane, glycol and glycerine. However, water is preferred and, in addition, it has been found advantageous to employ thickening agents and wetting agents either separately or together to control the flow characteristics of the desired liquid depending upon primarily the degree of hydrophilicity of the specific foam material employed. Thus, a number of foams are hydrophobic in the untreated condition and it is necessary to employ a wetting agent in the liquid such as propylene oxide polyols. A number of foams which are naturally hydrophobic become more hydrophilic in the open-celled foam. These foams often require a thickened water solution both to minimize absorption of the liquid into the foam and to prevent loss of the pattern initially impressed on the foam due to spreading of the liquid over the foam.

Any suitable thickener may be used to increase the viscosity of the water. Good results have been obtained with Cab-O-Sil M-5 (a colloidal silica type made by Godfrey Cabot Company) and Tylose UM-15000 (a carboxy methylcellulose type made by Wyandotte Chemical Company). The preferred viscosity of the thickened water solution is from about 125 to 225 centipoises.

It has been found that a 1% solution of carboxy methylcellulose having a viscosity of about 170 centipoises at 75° F., is quite suitable. It has also been determined that approximately 6 grams of the thickened solution is required per square yard of wetted area. Thus, about 0.06 gram of thickener is applied per square yard of wetted area. The amount of fluid can vary appreciably from this figure as more or less depth of pattern is desired or as operating conditions change.

An unlimited variety of patterns may be achieved by the processes of this invention. Thus the masking or coating of the solution on the foam sheet may take the form of, e.g., diamonds, squares, stripes, dots and so forth.

Application of the liquid can be accomplished by a number of methods. A preferred method is to apply the liquid by a printing operation. Alternatively, the liquid can be applied, for example, by brushing or spraying.

The following specific description serves to illustrate the invention and should not be regarded as unduly limiting the invention. Unless otherwise indicated, all parts are expressed in parts by weight.

With reference to the drawing, supply roll 3 delivers a sheet of open-celled polyurethane foam 4 of a thickness of 0.095 inch to rollers 8 and 10. Roller 8 has a smooth surface whereas roller 10 is an engraved roller having a diamond pattern thereon. Gravity feed means 12 is provided for inking printing roller 10 with a liquid which in this embodiment is a 1.0 percent by weight aqueous solution of carboxy methylcellulose having a viscosity of about 170 centipoises at 75° F. As the foam sheet passes between rollers 8 and 10, diamond-shaped areas 2 are masked or covered with the liquid. Thereafter, the foam sheet is exposed to a flame provided by burner 14 which will adhesively activate the unmasked or open areas 6 by softening and melting a thin layer of the foam surface. A fabric roll 16 supplies a cotton percaline fabric 18 which contacts the activated foam sheet and the two are compressed together as they pass between pressure rollers 20 and 22. In the areas 6 of the foam sheet which were not treated with the liquid, the foam sheet is strongly bonded to the fabric. The diamond areas 2 which were treated with the liquid are not bonded to the fabric and consequently will expand by virtue of their inherent resilience. The resulting foam-to-fabric laminate is of very light weight yet provides good insulation and breathability. In addition, the laminate has excellent drape and resistance to tearing and peeling.

In the foregoing embodiment of the invention, the materials were run at a speed of 53 feet per minute. However, the process can be run at rates which range from 90 to 120 feet per minute or higher.

Foam-to-fabric laminates prepared in accordance with this invention have maximum peel strength in the bonded areas with foam failure occuring about 20 ounces per inch.

A number of foam to fabric laminates were prepared in accordance with the procedure described in the foregoing embodiment. In each run, an open-celled polyurethane foam was employed. The procedure was the same in each case and the thickness of the foam and fabric prior to lamination were the same.

In Table 1, the drape of patterned foam to fabric laminates is compared with that of a laminate having no pattern. The particular test employed was ASTM D-1388-55-T which involves measuring the overhang of a fabric in centimeters. The measured value is called the drape of a fabric, and a stiff fabric will have a higher value than a limp fabric. The drape was determined by taking readings in six different positions and computing the average of the six readings. As shown in the table, the laminates prepared according to the invention have a much superior drape.

TABLE 1

| Fabric | Laminate thickness, inches | Pattern | Overhang, cm. |
|---|---|---|---|
| Cotton percaline | 0.070 | None | 8.1 |
| Do | 0.088 | Diamond | 10.3 |
| Do | 0.089 | Stripe | 12.4 |
| Rayon sateen | 0.068 | None | 8.3 |
| Do | 0.081 | Diamond | 9.5 |
| Do | 0.087 | Stripe | 12.2 |

Table 2, which is self-explanatory, shows the significant saving of foam resulting from preparing foam-to-fabric laminates in accordance with the invention. All measurements are in inches.

TABLE 2

|  | No pattern | Diamond | Stripe |
|---|---|---|---|
| Foam | 0.095 | 0.095 | 0.095 |
| White percaline | 0.007 | 0.007 | 0.007 |
| Total thickness | 0.102 | 0.102 | 0.102 |
| Laminate thickness | 0.070 | 0.088 | 0.089 |
| Loss | 0.032 | 0.014 | 0.013 |
| Percent loss | 31 | 14 | 13 |
| Foam | 0.095 | 0.095 | 0.095 |
| Blue sateen | 0.005 | 0.005 | 0.005 |
| Total thickness | 0.100 | 0.100 | 0.100 |
| Laminate thickness | 0.068 | 0.081 | 0.087 |
| Loss | 0.032 | 0.019 | 0.013 |
| Percent loss | 32 | 19 | 13 |

What is claimed is:

1. A process for obtaining a patterned foam-to-fabric laminate which comprises the steps of:
   (a) selectively applying a noncombustible liquid to a surface of a foam sheet in a predetermined discontinuous pattern to obtain selected spaced masked areas;
   (b) melting the unmasked areas of said surface by heating said surface with a flame; and
   (c) intimately contacting a fabric sheet with said foam sheet and compressing the two sheets together to form said laminate.

2. A process according to claim 1 wherein said liquid is an aqueous solution of a carboxy methylcellulose.

3. A process according to claim 1 wherein the foam sheet is a flexible open-celled polyurethane foam.

4. A process according to claim 3 wherein said liquid is printed onto said foam sheet.

5. A process for obtaining a patterned foam-to-fabric laminated material which comprises the steps of:
   (a) selectively applying a noncombustible liquid in a discontinuous predetermined pattern to a surface of a flexible polyurethane foam sheet to obtain spaced masked areas on the foam surface;

(b) heating said surface with a flame to melt the unmasked portions of said surface;
(c) placing a fabric sheet in contiguity with said surface; and
(d) compressing the foam and fabric sheets together to form the laminated material.

6. A process according to claim 5 wherein said liquid is an aqueous solution of a carboxy methyl cellulose.

7. A process according to claim 6 wherein the liquid is applied to the foam surface by printing.

8. A process according to claim 5 wherein the fabric sheet is cotton.

References Cited

UNITED STATES PATENTS 3,362,862   1/1968   King _____ 156—82

FOREIGN PATENTS 573,342   3/1959   Canada.
905,871   9/1962   Great Britain.

PHILIP DIER, *Primary Examiner.*

U.S. Cl. X.R.

156—289, 290